June 20, 1967  E. H. LEEMING  3,326,569
SNOW SLED
Filed April 14, 1966  2 Sheets-Sheet 1
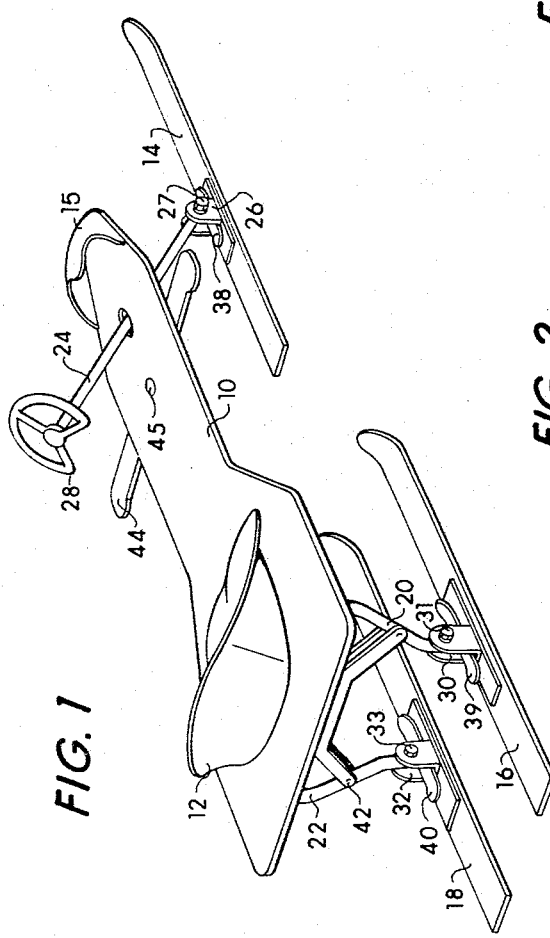
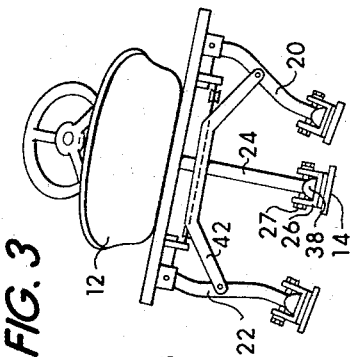
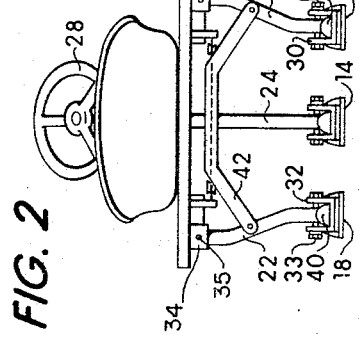
INVENTOR
EDWARD H. LEEMING
BY
*Stanley M. Schurgin*
ATTORNEY

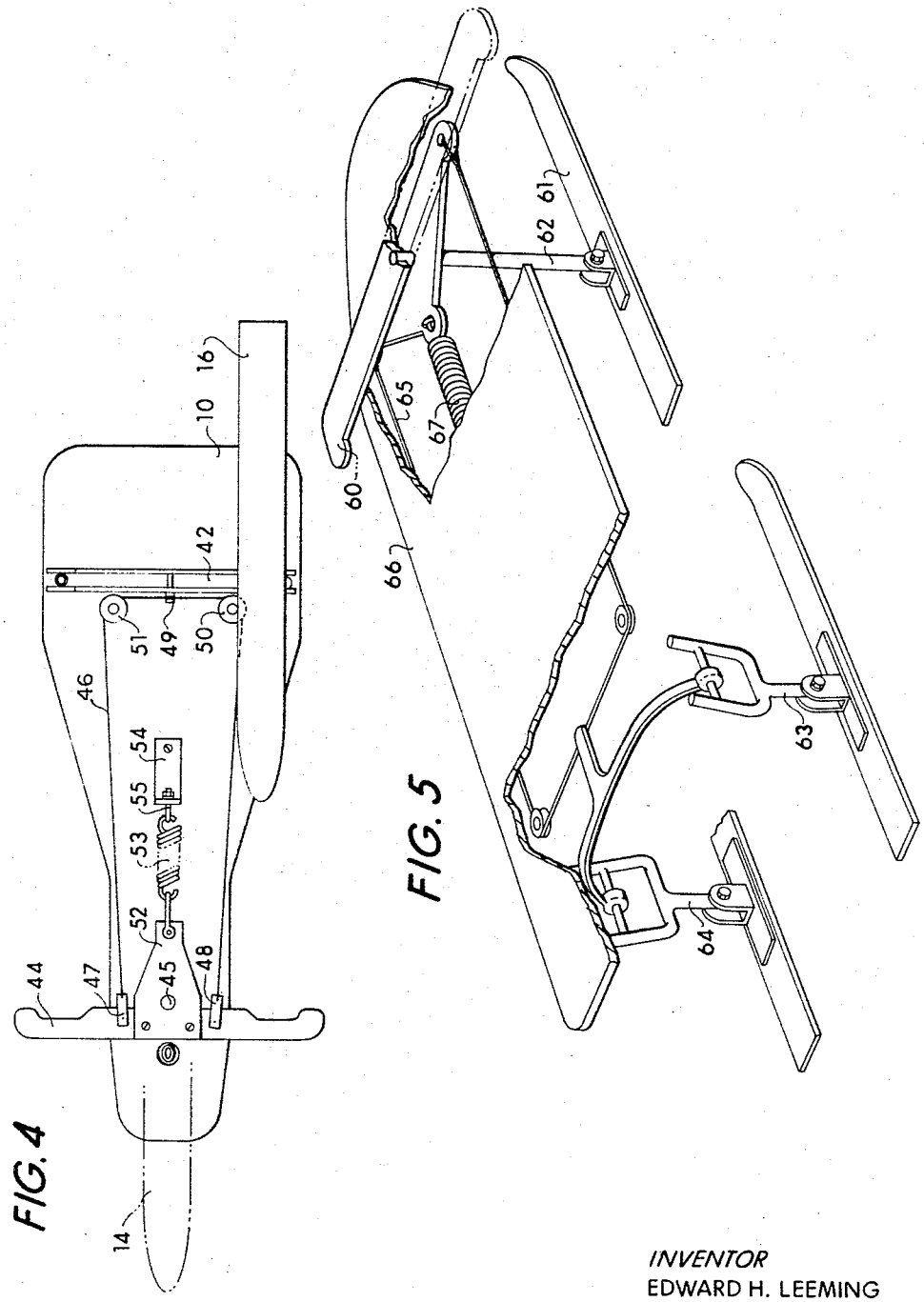

3,326,569
SNOW SLED
Edward H. Leeming, S. Row Road,
Townsend Harbor, Mass.
Filed Apr. 14, 1966, Ser. No. 542,533
9 Claims. (Cl. 280—16)

This invention relates to sleds and more particularly to sled construction offering improved maneuverability.

In the construction of sleds for downhill snow sliding, various means have been suggested to improve the maneuverability and turning capability of the sled. These means have, in general, employed one of two techniques; a steerable ski or runner to permit turning of the vehicle, and runners adapted to pivot about an axis longitudinal of the sled so that the runners would accommodate to the terrain in a turn. While providing some improvement in maneuverability over the simple child's sled, these constructions do not allow the complete versatility of motion which is possible by a human skier.

It is, therefore, an object of the present invention to provide an improved sled construction which permits maneuverability approaching that of a human on skis.

Another object of the invention is to provide a sled whose center of gravity shifts when the sled is in a turn.

A further object of the invention is to provide a sled whose structure accommodates itself to a particular maneuver being executed.

Briefly, the sled embodying the invention comprises a steerable front ski, and a pair of rear skis each connected to the sled body by a respective inwardly disposed strut pivotally attached to the body to permit movement of the strut about a longitudinal axis of the sled while the rear skis are movable only about a transverse axis. These struts are linked to a control bar or other suitable mechanism to allow their movement by the rider. The manuverability of the sled in turning is achieved by the judicious movement of the skis with respect to the sled body. To execute a turn, the operator turns the front ski in the direction of the turn and pivots the bar linked to the struts to cause rotation about their axis in a direction opposite to the turn. Since the struts are initially disposed inward with respect to the sled body, rotation of them causes one strut to assume a greater angle than the other to produce both a lateral and a tilting movement of the sled body in the direction of the turn. The center of gravity is thereby moved toward the center of turning to compensate for the centrifugal force generated in the turn. To steer out of the turn, the operator straightens the front ski and pivots the bar in a direction to cause the struts to rotate about their axis in the opposite direction to rectify the sled body. In this event, the center of gravity is moved away from the center of turning to aid in directing the sled out of the turn. The sled may also be tilted via the rear struts without turning the front ski to allow sled movement in a straight path while traversing a slope in a downward and lateral direction.

The invention will be more fully understood from the following detailed description taken in conjunction with the accompanying drawings in which:

FIG. 1 is a pictorial representation of a sled constructed according to the invention;

FIG. 2 is a rear view of the sled in its normal position;

FIG. 3 is a rear view of the sled when operating in a turn or on a slope;

FIG. 4 is a bottom view, partly cut away, of the embodiment of FIG. 1; and

FIG. 5 is a pictorial view, partly cut away, of another embodiment of the invention.

Referring to FIG. 1, there is shown a sled comprising a body 10 having a seat 12 on the rear portion thereof, a front ski 14 steerably connected to the sled body, and a pair of rear skis 16 and 18 pivotally connected to the rear portion of body 10 by respective inwardly directed struts 20 and 22. A suitable cowl 15 can be provided on the front of body 10 for streamlining. Front ski 14 is attached to body 10 by a steering column 24 disposed forward and downward with respect to the body at an angle of about 45° and pivotally connected at its lower end to ski 14 via a flange 26 and pin 27 and at its upper end to a steering wheel 28. Rear skis 16 and 18 are attached to respective struts 20 and 22 by respective flanges 30 and 32 and pins 31 and 33, and struts 20 and 22 are attached to body 10 via respective flanges 34 and 36 and pins 35 and 37. It will be observed that struts 20 and 22 are rotatable about a longitudinal axis only, while skis 16 and 18 are rotatable only about a transverse axis. Leaf springs 38, 39 and 40, or other suitable means, are provided at the joints of respective skis 14, 16 and 18 to return the skis to a normal position as they leave the surface when passing over rough terrain and thereby preventing any tendency of the skis to tip downward with the consequent danger of catching the ground and overturning the sled.

Struts 20 and 22 depend from body 10 downwardly and inwardly at an angle of approximately 20° to the vertical and are maintained a constant distance apart by a suitable linkage such as a tie bar 42 pivotally connected between the struts. Rotation of the struts is governed by a control bar 44 rotatably attached to the front portion of body 10, for example by pivot 45 and plate 52, and cable 46 secured to bar 44 by terminals 47 and 48 and to tie bar 42 by connection 49. Pulleys 50 and 51 are mounted on body 10 in line with connection 49 to guide cable 46. An extension spring 53 is secured between plate 52 and a bracket 54 attached to body 10 to urge control bar 44 toward its normal position. This spring can be adjustable, for example by extending or retracting connecting bolt 55, to provide a restoring force commensurate with the weight of a particular rider. When turning control bar 44, the rider must exert sufficient force to overcome the urging of spring 53 and when this turning force is released, the control bar, and consequently the sled, will tend to return to its normal upright position.

When operating the sled on level terrain or on a straightaway, the operator maintains control bar 44 in its neutral position, that is orthogonal to the sled axis, to keep rear skis 16 and 18 in the symmetrical position as illustrated in FIG. 2. In this position, of course, all three skis are flat on the ground and the sled body is parallel to the ground, with the center of gravity being midway of the sled width.

To execute a turn, say to the right, the operator rotates control bar 44 to the right with his feet to cause, via cable 46, struts 20 and 22 to rotate in a direction opposite to the turning direction, in this case to the left, as shown in FIG. 3. At the same time, front ski 14 is turned right to the desired degree by steering wheel 28. Since struts 20 and 22 normally incline inward from the vertical, in a turn the strut farthest from the center of turning is more vertical than the other strut; for example, in FIG. 3, strut 22 is more vertical than strut 20. The result of the unequal inclination of the struts in a turn is to cause tipping of body 10 in the direction of the strut and also a lateral movement of the body with respect to the skis, with consequent movement of the center of gravity toward the turning center. Referring to FIG. 3, body 10 is tilted to the right, and skis 14, 16 and 18 are tilted on their right edges, but ski 18 is tilted to a greater extent because of the inclination of strut 22. To bring the sled out of a turn, front ski 14 is turned in a direction opposite to the turn, to the left in the instant example, and control bar 44 is simultaneously turned to the left to rotate struts 20 and 22 to the right causing body 10 to return to its horizontal condition. Thus, the sled is directed in and out of turns by its tipping action under the control of the operator and it is evident that the operator has much the same control over the sled motion as a human on skis.

Another features which enhances the maneuverability of the sled is the angle of the steering shaft which controls front ski 14. This steering shaft is inclined backward from bottom to top at an angle of about 45 degrees from the perpendicular. This inclined angle results in an increase in the lateral tilt of the front ski when it is steered in the direction of the turn of the vehicle, and, conversely, results in a decrease in lateral tilt of the front ski when it is turned in a direction opposite to the tilt of the vehicle. The effect of this variable tilt permits the sled body to be quickly steered into a turn.

A somewhat simplified version of the present invention is illustrated in FIG. 5 wherein the steering of the front ski and the tilting of the body are both accomplished by a single control. Referring to FIG. 5, control bar 60 on the front portion of body 66 is linked to front ski 61 by rod 62, and linked to rear struts 63 and 64 by cable 65, as in the embodiment of FIG. 1. A spring 67 is disposed between bar 60 and body 66, as discussed hereinabove, to urge bar 60 and hence body 66 toward the normal position. In operation, the rider turns bar 60 in the desired direction, either with his feet if he is seated upon the sled or with his hands if the rider is lying on the sled, steering ski 61 and causing struts 63 and 64 to rotate as described hereinabove to tilt the sled body in the direction of turn. Similarly, the sled is maneuvered out of the turn, in the manner described. As an alternative, the rear skis can each be connected to the sled body by two or more struts pivotally mounted on the body. In this instance, the rear skis would not be pivotal about a transverse axis, as in FIG. 5, but would only move transversely with the corresponding struts. This constructional variation can, of course, also be incorporated in the embodiment of FIG. 1.

Various modifications and alternative implementations will occur to those versed in the art without departing from the true scope of the present invention. For example, two or more struts can be employed to support the rear skis, and means other than an extension spring, such as torsion bars, can be employed to maintain the upright alignment of the rear skis. In addition, well known features can be designed into the present invention such as a drag brake and shock absorbers. Accordingly, it is not intended to limit the invention by what has been particularly shown and described except as indicated in the appended claims.

What is claimed is:

1. A sled comprising a body, a front ski rotatably connected to the front portion of said body, a pair of rear skis each connected to the rear portion of said body by at least one respective strut pivotally connected on one end to said body to permit movement of the strut about a longitudinal axis and connected on the other end to said ski, said strut disposed inwardly from said pivoted connection toward the longitudinal axis of said body, rigid linking means pivotally connected between said struts to maintain a specified separation therebetween, and means for pivoting said struts about the longitudinal axis to cause said body to tilt with respect to the terrain on which the sled rests.

2. The sled according to claim 1 in which said front ski is connected to said body by a steering shaft inclined downward and forward at an acute angle to the longitudinal axis of the sled body.

3. The sled according to claim 1 in which said linking means is a tie bar pivotally connected between said struts.

4. The sled according to claim 1 in which each of said struts are normally disposed downward and inward from the plane of the sled body at an angle of about seventy degrees therefrom.

5. The sled according to claim 1 in which said front ski is connected to said body by a steering shaft and is pivotally mounted to said shaft to permit ski movement about a transverse axis, and said rear skis are pivotally connected to said struts to permit their movement about a transverse axis.

6. The sled according to claim 1 in which said means for pivoting the struts includes a control bar attached to the front portion of said body and connected to said struts by means of cable and pulleys.

7. The sled according to claim 5 further including an extension spring connected between said control bar and said body and operative to urge said struts toward their normal position when said body is tilted with respect to the ground.

8. The sled according to claim 5 further including means connected between said control bar and said body and operative to urge said struts toward their normal position when said body is tilted with respect to the ground.

9. The sled according to claim 5 in which said control bar is also attached to and operative to rotate said front ski.

References Cited

FOREIGN PATENTS 1,032,750    7/1953    France.

B. HERSH, *Primary Examiner.*

L. D. MORRIS, *Assistant Examiner.*